US007587003B2

(12) United States Patent
Pliquett et al.

(10) Patent No.: US 7,587,003 B2
(45) Date of Patent: Sep. 8, 2009

(54) METHOD AND DEVICE FOR CARRIER-FREQUENCY SYNCHRONIZATION OF A VESTIGIAL-SIDEBAND-MODULATED SIGNAL

(75) Inventors: Jochen Pliquett, Munich (DE); Thomas Reichert, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 622 days.

(21) Appl. No.: 11/301,641

(22) Filed: Dec. 13, 2005

(65) Prior Publication Data

US 2006/0126760 A1 Jun. 15, 2006

(30) Foreign Application Priority Data

Dec. 13, 2004 (DE) ....................... 10 2004 059 955
Apr. 6, 2005 (DE) ....................... 10 2005 015 835

(51) Int. Cl.
*H03D 1/24* (2006.01)

(52) U.S. Cl. ....................... 375/321; 375/316; 375/326; 375/329; 375/341; 375/344

(58) Field of Classification Search ................. 375/260, 375/346, 316, 321, 326, 341; 348/725, 608; 327/354
See application file for complete search history.

(56) References Cited

U.S. PATENT DOCUMENTS 5,103,310 A * 4/1992 Gibson et al. ............... 348/608
5,894,334 A * 4/1999 Strolle et al. ................ 348/725
6,606,010 B1 8/2003 Poklemba et al.
2004/0109670 A1 6/2004 Kim et al.
2004/0120412 A1* 6/2004 Banerjea ..................... 375/260
2005/0058229 A1* 3/2005 Alagha ....................... 375/346
2005/0157821 A1 7/2005 Kim et al.
2007/0222495 A2* 9/2007 Pliquett et al. .............. 327/354

FOREIGN PATENT DOCUMENTS

DE 109848 11/1971
DE 10309262 9/2004
WO WO 02/058354 A1 7/2002

* cited by examiner

*Primary Examiner*—Sudhanshu C Pathak
(74) *Attorney, Agent, or Firm*—Ditthavong Mori & Steiner, P.C.

(57) ABSTRACT

A method and a device for carrier-frequency synchronization of a vestigial-sideband-modulated received signal ($r_{VSB}(t)$) with a carrier signal ($e^{j(2\pi(f_T+\Delta f)t+\Delta\varphi)}$), which is affected by a frequency offset and/or phase offset ($\Delta f$, $\Delta\varphi$), estimates the frequency offset and/or phase offset ($\Delta f$, $\Delta\varphi$) of the carrier signal ($e^{j(2\pi(f_T+\Delta f)t+\Delta\varphi)}$) by means of a maximum-likelihood estimation. For this purpose, the vestigial-sideband-modulated received signal ($r_{VSB}(t)$) is converted into a modified vestigial-sideband-modulated received signal ($x_{VSB}'(t')$), which provides time-discrete complex rotating phasors ($|x_{VSB}'(t')|\cdot e^{j2\pi\Delta f\cdot t'+\Delta\varphi}$), in which only the time-discrete phases ($2\pi\Delta ft'+\Delta\varphi$) are dependent upon the frequency offset and/or phase offset ($\Delta f$, $\Delta\varphi$).

15 Claims, 3 Drawing Sheets

15
$r_{VSB}(t)$
10
$e^{-j\frac{2\pi}{4T_{VSB}}t}$
$r_{VSB}'(t)$
7
$e_{VSB}'(t)$
8
$h_{EST}(t)$
$v_{VSB}'(t)$
9
$-\varepsilon\cdot Ts$
$v_{\varepsilon VSB}'(t)$
12
$\mu\frac{Ts}{2}$
$v_{\varepsilon VSB}'(t')$
$w_{VSB}'(t')$
11
13
$e^{-j\cdot\mu\frac{\pi}{2}}$
14
$\frac{(w_{VSB}(t')}{|(w_{VSB}(t')|}$
$\chi_{VSB}'(t)$
Maximum-likelihood estimator
$\Delta\hat{f}$
$\Delta\hat{\varphi}$
18

METHOD AND DEVICE FOR CARRIER-FREQUENCY SYNCHRONIZATION OF A VESTIGIAL-SIDEBAND-MODULATED SIGNAL

The invention relates to a method and a device for carrier-frequency synchronisation with a vestigial-sideband-modulated signal (VSB).

If transmitters and receivers are synchronised with one another within a transmission system, a transmitter-end adaptation and a receiver-end adaptation of the clock and carrier signal takes place with regard to phase position and frequency respectively. The carrier-frequency synchronisation to be considered below presupposes a received signal, which is synchronised with regard to the clock signal.

Document DE 103 09 262 A1 describes a method for carrier-frequency synchronisation of a signal with digital symbol sequences, in which the frequency offset and/or phase offset of the carrier signal is estimated from the demodulated received signal by means of maximum-likelihood estimation. The received signal containing the digital symbol sequences consists of complex rotating phasors associated with the individual sampling times, of which the discrete phases depend only on the sought frequency offset and/or phase offset of the carrier signal, and of which the discrete amplitudes depend only on the digital symbol values of the demodulated received signal. The maximum-likelihood estimation of the sought frequency offset and/or phase offset of the carrier signal takes place by maximising the likelihood function, which is formed from the sum of the real components of all of the time-discrete, complex rotating phasors of the received signal. Maximising the likelihood function is achieved by rotating the associated, complex rotating phasor of the received signal in a clockwise direction for each sampling time at the level of the sought frequency offset and/or phase offset, so that it is disposed on the real axis. In this manner, it is possible, to obtain the sought frequency offset and/or phase offset of the carrier signal by observing the extreme-values of the likelihood function separately for the frequency offset and/or phase offset.

The time-discrete received signal in DE 103 09 262 A1 provides one complex rotating phasor for each sampling time, of which the phase value depends only upon the frequency offset and/or phase offset of the carrier signal, and of which the amplitude value depends on the symbol value of the received signal sequence to be transmitted at the respective sampling time. A time-discrete received signal of this kind is based upon a comparatively simple modulation, for example, a conventional amplitude modulation. By contrast, a VSB received signal provides no time-discrete, complex rotating phasors, of which the time-discrete phases are dependent only upon the frequency offset and phase offset. In this case, the use of a maximum-likelihood estimation to estimate the sought frequency offset and/or phase offset of the carrier signal in the sense of the method and the device known from DE 103 09 262 A1 therefore fails to achieve the goal.

The invention is accordingly based upon the object of providing a method and a device for estimating the frequency offset and/or phase offset in the carrier signal in the case of a vestigial-sideband-modulated received signal using a maximum-likelihood estimation.

The object of the invention is achieved by a method for carrier-frequency synchronisation with the features of claim 1 and by a device for carrier-frequency synchronisation with the features of claim 10. Further developments of the invention are specified in the dependent claims.

In a first stage, the VSB received signal is converted into a modified VSB signal, which, in an equivalent manner to a quadrature-modulated signal—for example, a PAM, QPSK or $\pi/4$-QPSK signal—provides time-discrete, complex rotating phasors consisting respectively of an in-phase component and a quadrature component. The symbol duration of the VSB received signal according to the invention is therefore adjusted to the level of half the symbol duration of a quadrature-modulated signal, and the accordingly-adapted VSB received signal is converted by down mixing into a modified VSB signal, which consists of a complex rotating phasor typical for a quadrature-modulated signal and provides a signal display equivalent to that of an offset QPSK signal.

In a second stage, this modified VSB received signal, which is equivalent to an offset QPSK signal, is additionally converted, in order to realise time-discrete complex rotating phasors, which are dependent only upon the frequency offset and phase offset of the carrier signal. The modified VSB signal is therefore converted by sampling with an oversampling factor of typically eight, estimation filtering with a signal-adapted estimation filter and three further signal-processing stages according to the invention, in order to realise an additionally-modified VSB received signal, of which the time-discrete complex rotating phasors each provide phases, which depend only upon the frequency offset and/or phase offset of the carrier signal used.

The first signal-processing stage involves a further sampling, which generates a time-discrete, modified VSB received signal with two sampling values per symbol period. This accordingly re-sampled VSB received signal contains in each of its discrete, complex rotating phasors an additional phase dependent upon the respective sampling time, which, in the subsequent, second signal-processing stage, is compensated by a respective, inverse phase, in the context of a complex multiplication with a complex rotating phasor. In a third signal-processing stage, the VSB received signal, freed from its additional phase in each of the time-discrete complex rotating phasors, is finally subjected to modulus-scaled squaring, in order to ensure that the amplitude of each time-discrete complex rotating phasor of the modified VSB received signal has a positive value.

With the method according to the invention and the device according to the invention for carrier-frequency synchronisation, a modified VSB received signal, of which the time-discrete complex rotating phasors each provide phases, which are dependent only upon the frequency offset and/or phase offset of the carrier signal used, is therefore formed from the VSB received signal.

The time-discrete phases of the multi-modified, time-discrete VSB received signal are then determined via an argument function, and a phase characteristic is formed. This phase characteristic of the modified VSB received signal, which is periodic over the period $2\cdot\pi$ and non-steady, is then "steadied" at the non-steady points to provide a phase-continuous phase characteristic of the modified VSB received signal.

A phase-continuous phase characteristic of a multi-modified VSB received signal generated in this manner can be subjected to a maximum-likelihood estimation in the sense of DE 103 09 262, in order to determine a frequency offset and/or phase offset possibly occurring in the carrier signal used, thereby approaching the goal of a subsequent carrier-frequency synchronisation of the VSB received signal.

A preferred exemplary embodiment of the method according to the invention for carrier-frequency synchronisation of a VSB signal and the device according to the invention for carrier-frequency synchronisation of a VSB signal are explained in greater detail below with reference to the drawings. The drawings are as follows.

Figure 3:
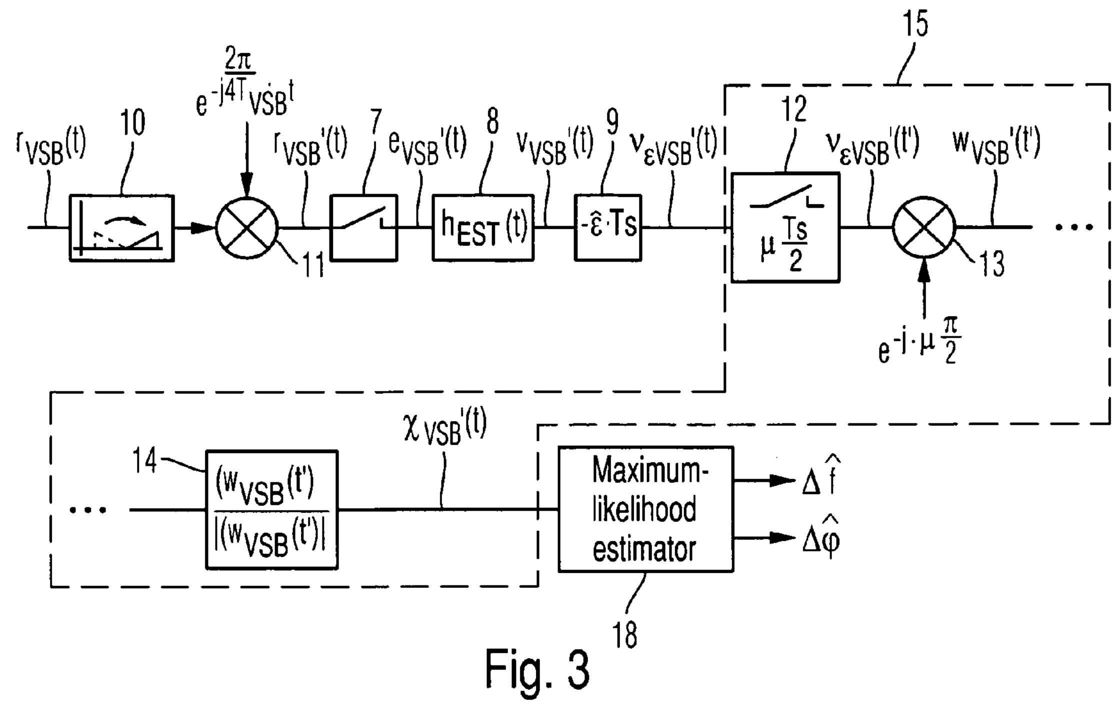
FIG. 3 shows a block circuit diagram of the device for carrier-frequency synchronisation according to the invention.
Figure 4:
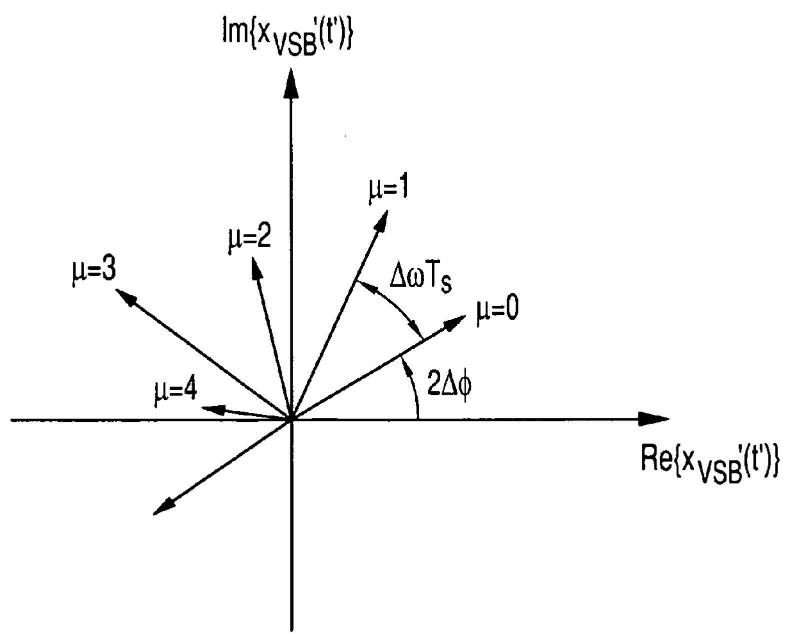
FIG. 4 shows a complex phasor diagram of a modified VSB received signal according to the invention.
Figure 5:
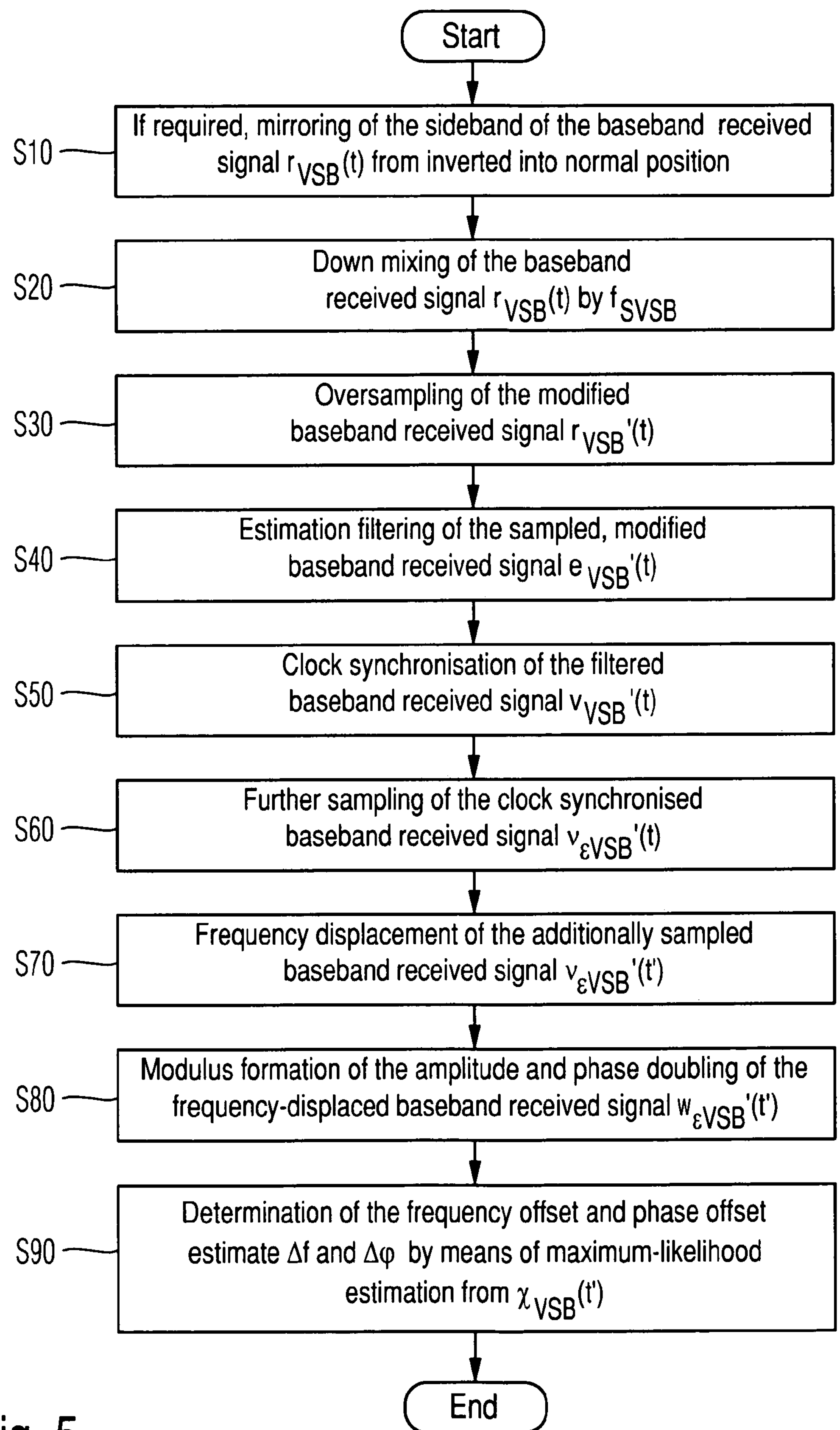
FIG. 5 shows a flow chart of the method according to the invention for carrier-frequency synchronisation.

Before describing an embodiment of the method according to the invention and the device according to the invention for carrier-frequency synchronisation with a VSB received signal in greater detail with reference to FIGS. 3 to 5, the following paragraphs present a derivation of the required mathematical background.

Accordingly, in a first stage, the VSB signal $s_{VSB}(t)$ is converted according to equation (1) into a modified VSB received signal, which provides a signal display equivalent to an offset QPSK signal with a complex rotating phasor.

$$s_{VSB}(t)=\sum_{v=-\infty}^{+\infty} q(v)\cdot\delta(t-v\cdot T_{VSB}) \tag{1}$$

In this equation, the values q(v) in a 2VSB signal represent the symbol sequence with the symbol alphabet {+1+pilot, −1+pilot} and the symbol duration $T_{VSB}$. A pilot carrier, for which the condition pilot=0 applies, is conventionally contained therein. In the deliberations presented below, ideal conditions—pilot=0—are assumed.

Figure 1:
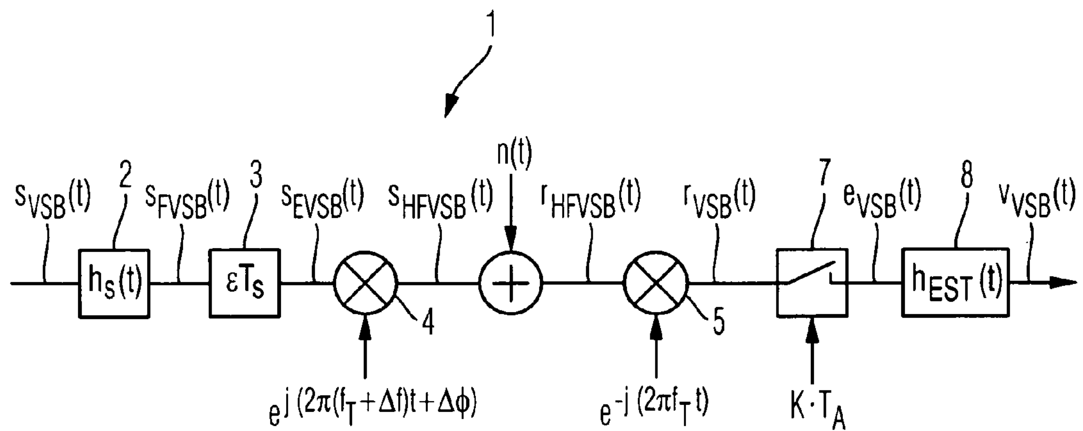
FIG. 1 shows an extended block circuit diagram of the transmission system.

In a complex baseband model of a transmission system 1 for time-continuous complex signals, as shown in FIG. 1, the VSB signal $S_{VSB}(t)$ is supplied to a transmission filter 2. As in the case of a quadrature-modulated signal—such as a PAM, QPSK or π/4-QPSK modulated signal—, this is realised as a cosine filter with a transmission function $H_S(f)$ and a roll-off factor r, as shown in equation (2).

$$H_s(f)=\begin{cases}1 & \text{für}\left|f\right|<\frac{f_s}{2}\\ \cos\left[\frac{\pi|f|}{2r\cdot f_s}-\frac{\pi(1-r)}{4r}\right] & \text{für}(1-r)\frac{f_s}{2}<\left|f\right|\leq(1+r)\frac{f_s}{2}\\ 0 & \text{für}(1+r)\frac{f_s}{2}<|f|\end{cases} \tag{2}$$

[für = for]

By contrast with the transmission filter in a PAM, QPSK or π/4 QPSK modulated signal, the transmission filter 2 associated with a VSB signal $S_{VSB}(t)$ is a cosine filter symmetrical to the frequency $$f=\frac{1}{4}\cdot f_{SVSB},$$

wherein $f_{SVSB}$ is the symbol frequency of the VSB signal inverse to the symbol period $T_{VSB}$. Its transmission function $H_{SVSB}(f)$ is therefore derived from a displacement of the transmission function $H_S(f)$ of a quadrature-modulated signal by the frequency $$f=\frac{1}{4}\cdot f_{SVSB}$$

in the sense of equation (3).

$$H_{SVSB}(f)=H_s\left(f-\frac{1}{4}\cdot f_{SVSB}\right) \tag{3}$$

The context shown in equation (4) applies for the symbol rate $f_s$ from equation (2), which relates to classical, quadrature-modulated signals, and for the symbol frequency of a VSB signal $f_{SVSB}$:

$$f_s=\frac{1}{2}\cdot f_{SVSB} \tag{4}$$

The impulse response $h_{SVSB}(t)$ of the transmission filter 2 for a VSB signal is therefore derived from the following equation (5):

$$h_{SVSB}(t)=h_s(t)\cdot e^{j\frac{2\pi}{4T_{VSB}}t} \tag{5}$$

The VSB signal $S_{FVSB}(t)$ disposed at the output of the transmission filter 2 is derived from a convolution of the VSB received signal $S_{VSB}(t)$ according to equation (1) with the impulse response $h_{SVSB}(t)$ of the transmission filter 2 according to equation (5) and is described mathematically by equation (6), which is mathematically converted over several stages:

$$\begin{aligned}s_{FVSB}(t)&=\left(h_s(t)\cdot e^{j\frac{2\pi}{4T_{VSB}}t}\right)*\sum_{v=-\infty}^{+\infty}q(v)\cdot\delta(t-v\cdot T_{VSB})\\&=\sum_{v=-\infty}^{+\infty}q(v)\cdot h_s(t-v\cdot T_{VSB})\cdot e^{j\frac{2\pi}{4T_{VSB}}(t-v\cdot T_{VSB})}\\&=e^{j\frac{2\pi}{4T_{VSB}}t}\cdot\sum_{v=-\infty}^{+\infty}q(v)\cdot e^{-j\frac{\pi}{2}v}\cdot h_s(t-v\cdot T_{VSB})\end{aligned} \tag{6}$$

According to equation (7), the value b(v) is introduced for the term $$q(v)\cdot e^{-j\frac{\pi}{2}v}$$

in equation (6):

$$b(v):=q(v)\cdot e^{-j\frac{\pi}{2}v} \tag{7}$$

If the value b(v) is observed separately for even-numbered and odd-numbered v, then for even-numbered v=2n (n: integer), the mathematical relationship of equation (8) is obtained, which, after mathematical conversion, gives real values $a_R(n)$:

$$\begin{aligned}b(v)\big|_{v=2n}&=e^{-j\frac{\pi}{2}2n}\cdot q(2n)\\&=e^{-j\pi n}\cdot q(2n)\\&=(-1)^n\cdot q(2n):=a_R(n)\end{aligned} \tag{8}$$

With odd-numbered v=2n+1 (n: integer), for the value b(v), the mathematical relationship of equation (9), is obtained, which, after mathematical conversion, gives complex values $j\cdot a_x(n)$:

$$\begin{aligned} b(v)|_{v=2n+1} &= e^{-j\frac{\pi}{2}(2n+1)}\cdot q(2n+1) \\ &= j\cdot(-1)^{n+1}\cdot q(2n+1): \\ &= j\cdot a_I(n) \end{aligned} \tag{9}$$

The term $$q(v)\cdot e^{-j\frac{\pi}{2}v}$$

in equation (6) can be presented according to equation (10) for even-numbered v=2n as the even-numbered term $b(v)|_{v=2n}$, and for odd-numbered v=2n+1, as the odd-numbered term $b(v)|_{v=2n+1}$:

$$q(v)\cdot e^{-j\frac{\pi}{2}v} = b(v)|_{v=2n} + b(v)|_{v=2n+1} \tag{10}$$

The mathematical relationship for the output signal $S_{FVSB}(t)$ at the output of the transmission filter 2 in equation (6) can therefore be converted according to equation (10), taking into consideration equation (8) and (9), as shown in equation (11):

$$s_{FVSB}(t) = e^{j\frac{2\pi}{4T_{VSB}}t}\cdot\left(\sum_{n=-\infty}^{+\infty} a_R(n)\cdot h_S(t-2n\cdot T_{VSB}) + j\cdot\sum_{n=-\infty}^{+\infty} a_I(n)\cdot h_S(t-2n\cdot T_{VSB}-T_{VSB})\right) \tag{11}$$

The subsequent lag element 3 models the time offset ϵ·T occurring as a result of the absent or inadequate synchronisation between the transmitter and the receiver, which is derived from a timing offset ϵ. The timing offset ϵ in this context can adopt positive and negative values typically between ±0.5. The filtered symbol sequence $S_{\epsilon VSB}(t)$ at the output of the lag element 3, which takes the time offset ϵ·T into consideration, is therefore derived according to equation (12):

$$s_{\varepsilon VSB}(t) = e^{j\frac{2\pi}{4T_{VSB}}t}\cdot\left(\sum_{n=-\infty}^{+\infty} a_R(n)\cdot h_S(t-\varepsilon\cdot T_{VSB}-2n\cdot T_{VSB}) + j\cdot\sum_{n=-\infty}^{+\infty} a_I(n)\cdot h_S(t-\varepsilon\cdot T_{VSB}-2n\cdot T_{VSB}-T_{VSB})\right) \tag{12}$$

The lag-affected, filtered symbol sequence $S_{\epsilon VSB}(t)$ is mixed in a VSB modulator—modelled as a multiplier 4 in FIG. 1—with a complex carrier signal $e^{j(2\pi(f_T+\Delta f)t+\Delta\phi)}$ to form a VSB-modulated HF-transmission signal $S_{HFVSB}(t)$. The carrier signal $e^{j(2\pi(f_T+\Delta f)t+\Delta\phi)}$ has a carrier frequency $f_T$, which has a frequency offset Δf and phase offset Δϕ. The mathematical context for the VSB-modulated HF transmission signal $S_{HFVSB}(t)$ is presented in equation (13):

$$s_{HFVSB}(t) = e^{j\frac{2\pi}{4T_{VSB}}t}\cdot\left[\sum_{n=-\infty}^{+\infty} a_R(n)\cdot h_S(t-\varepsilon T_{VSB}-2nT_{VSB}) + j\cdot\sum_{n=-\infty}^{+\infty} a_I(n)\cdot h_S(t-\varepsilon T_{VSB}-2nT_{VSB}-T_{VSB})\right]\cdot e^{j(2\pi(f_T+\Delta f)t+\Delta\varphi)} \tag{13}$$

Additive, white Gaussian noise (AWGN) n(t), which provides a real and an imaginary component $n_R(t)$ and $n_I(t)$ as shown in equation (14), is superimposed additively onto the VSB-modulated transmission signal $S_{HFVSB}(t)$ on the transmission path between the transmitter and a receiver.

$$n(t)=n_R(t)+j\cdot n_I(t) \tag{14}$$

The VSB-modulated HF received signal $r_{HFVSB}(t)$ arriving in the receiver is therefore obtained from equation (15):

$$r_{HFVSB}(t)=s_{HFVSB}(t)+n(t) \tag{15}$$

In the receiver, the VSB-modulated received signal $r_{HFVSB}(t)$ with superimposed noise n(t) is mixed down into the baseband with the carrier signal $e^{-j2\pi f_T t}$ in a demodulator—modelled as the multiplier 5 in FIG. 1. The demodulated VSB received signal $r_{VSB}(t)$ at the output of the demodulator 5 is derived according to the equation (16):

$$\begin{aligned} r_{VSB}(t) &= s_{\varepsilon VSB}(t)\cdot e^{j(2\pi\Delta f+\Delta\varphi)} + n(t) = \\ & e^{j\frac{2\pi}{4T_{VSB}}t}\cdot\left[\sum_{n=-\infty}^{+\infty} a_R(n)\cdot h_S(t-\varepsilon T_{VSB}-nT_{VSB}) + j\cdot\sum_{n=-\infty}^{+\infty} a_I(n)\cdot h_S(t-\varepsilon T_{VSB}-2nT_{VSB}-T_{VSB})\right]\cdot \\ & e^{j(2\pi\Delta ft+\Delta\varphi)} + n(t) \end{aligned} \tag{16}$$

Figure 2:
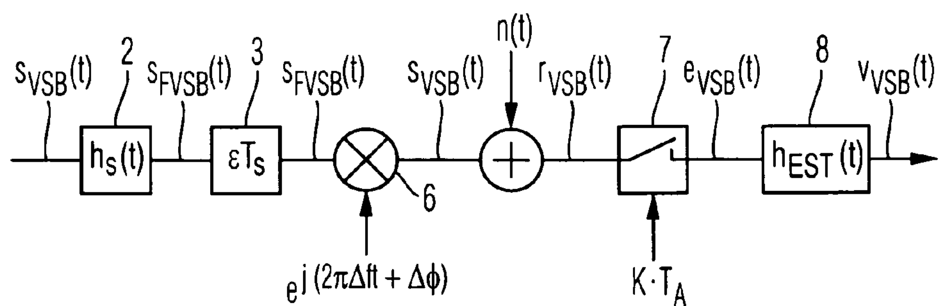
FIG. 2 shows a reduced block circuit diagram of the transmission system.

As can be seen from equation (16), some of the system-theoretical effects of the modulator 4 and the demodulator 6 in the transmission system 1 on the VSB-modulated signal are cancelled, so that the modulator 5 and the demodulator 6 in FIG. 1 can be replaced by a single multiplier 7 as shown in the reduced block circuit diagram in FIG. 2.

If the VSB baseband received signal $r_{VSB}(t)$ according to equation (16) is mixed with a signal $$e^{-j\frac{2\pi}{4T_{VSB}}t},$$

if the symbol duration $T_{VSB}$ of the VSB signal according to the equation (17) is adjusted to half the symbol duration $T_S$ of a quadrature-modulated signal and if the frequency-displaced cosine filter $$H_S\left(f-\frac{1}{4}\cdot f_{SVSB}\right)$$

according to equation (2) of a quadrature-modulated signal is used as the transmission filter of the VSB signal, the mathematical relationship of equation (18) is derived, starting from equation (16), for the modified VSB baseband received signal $r_{VSB}'(t)$.

$$T_{VSB}=\frac{1}{2}\cdot T_S \tag{17}$$

$$r'_{VSB}(t)=\left(\sum_{n=-\infty}^{+\infty}a_R(n)\cdot h_S(t-\varepsilon T_S-n\cdot T_S)+ j\cdot\sum_{n=-\infty}^{+\infty}a_I(n)\cdot h_S\left(t-\varepsilon T_S-n\cdot T_S-\frac{T_S}{2}\right)\right)\cdot e^{j(\Delta ft+\Delta\varphi)}+n(t) \tag{18}$$

The mathematical term for the modified VSB baseband received signal $r_{VSB}'(t)$ in equation (18) corresponds to the signal display for an offset QPSK signal, of which the quadrature component is phase-displaced relative to the in-phase component by half of one symbol length $T_S$.

The modified VSB baseband received signal $r_{VSB}'(t)$ is supplied to a sampling and holding element 7, referred to below as the second sampling and holding element for an oversampling of the filtered, modified VSB baseband received signal at a sampling rate $f_A$, which is increased by comparison with the symbol frequency $f_{SVSB}$ of the received signal $r_{VSB}'(t)$ by the oversampling factor os. In this context, the oversampling factor os has a value of 8, as shown in detail in [1]: K. Schmidt: "Digital clock recovery for bandwidth-efficient mobile telephone systems" [Digitale Taktrückgewinnung für bandbreiteneffiziente Mobilfunksysteme], 1994, ISBN 3-18-14 7510-6.

After the sampling of the modified VSB baseband received signal $r_{VSB}'(t)$, an estimation filtering of the signal takes place in an estimation filter 8. The estimation filter 8 has the task of minimising data-dependent jitter in the signal. If the transmission filter 2 according to equation (2) has a frequency spectrum $H_S(f)$, which corresponds to a cosine filter with a roll-off factor r, the frequency spectrum $H_{EST}(f)$ of the estimation filter 8 must be designed according to equation (19) dependent upon the frequency spectrum $H_S(f)$ of the transmission filter 2 in order to minimise data-dependent jitter in the modified VSB baseband received signal $r_{VSB}'(t)$, as shown in [1].

$$H_{EST}(f)=\begin{cases}H_S(f-f_S)+H_S(f+f_S) & \text{für } |f|\le\frac{f_S}{2}(1+r)\\ \text{beliebig} & \text{für } \frac{f_S}{2}(1+r)<|f|\le f_S\\ 0 & \text{für } f_S<|f|\end{cases} \tag{19}$$

[beliebig = random; für = for]

The frequency response $H_{GES}(f)=H_S(f)\cdot H_{EST}(f)$ of the transmission system as a whole, consisting of transmission filter 2 and estimation filter 8, can be interpreted according to the equation (20) as a low pass filter $H_{GES0}(f)$ symmetrical to the frequency f=0 with a bandwidth of $$\frac{f_S}{2}\cdot r,$$

which is frequency-displaced in each case by $$\pm\frac{f_S}{2}:$$

$$\begin{aligned}H_{GES}(f)&=H_{GES0}(f)*\left(\delta\left(f-\frac{f_S}{2}\right)+\delta\left(f+\frac{f_S}{2}\right)\right)\\&=H_{GES0}\left(f-\frac{f_S}{2}\right)+H_{GES0}\left(f+\frac{f_S}{2}\right)\end{aligned} \tag{20}$$

The corresponding impulse response $h_{GES}(t)$ is therefore derived according to equation (21):

$$h_{GES}(t)=h_{GES0}(t)\cdot\left(e^{j2\pi\frac{f_S}{2}t}+e^{-j2\pi\frac{f_S}{2}t}\right)=h_{GES0}(t)\cdot\cos\left(2\pi\frac{f_S}{2}t\right) \tag{21}$$

The signal $v_{VSB}'(t)$ at the output of the estimation filter 8 can therefore be obtained according to equation (22), in that, in the modified VSB received signal $r_{VSB}'(t)$ in the baseband, as shown in equation (18), the impulse response $h_S(t)$ of the transmission filter is replaced with the impulse response $h_{GES}(t)$ of the transmission system as a whole.

$$v'_{VSB}(t)=\left[\sum_{n=-\infty}^{+\infty}a_R(n)\cdot h_{GES}(t-\varepsilon T_S-nT_S)+ j\cdot\sum_{n=-\infty}^{+\infty}a_I(n)\cdot h_{GES}\left(t-\varepsilon T_S-\frac{T_S}{2}-nT_S\right)\right]\cdot e^{j(2\pi\Delta ft+\Delta\varphi)}+n(t) \tag{22}$$

Starting from equation (22), the impulse response $h_{GES}(t-\varepsilon T_S-nT_S)$ can be described according to equation (23):

$$h_{GES}(t-\varepsilon T_S-nT_S)= h_{GES0}(t-\varepsilon T_S-nT_S)\cdot(-1)^n\cdot\cos\left(2\pi\frac{f_S}{2}(t-\varepsilon T_S)\right) \tag{23}$$

Similarly, the mathematical relationship for the impulse response $$h_{GES}\left(t-\varepsilon T_S-\frac{T_S}{2}-nT_S\right)$$

can be determined in equation (24).

$$h_{GES}\left(t-\varepsilon T_S-\frac{T_S}{2}-nT_S\right)= h_{GES0}\left(t-\varepsilon T_S-\frac{T_S}{2}-nT_S\right)\cdot(-1)^n\cdot\sin\left(2\pi\frac{f_S}{2}(t-\varepsilon T_S)\right) \tag{24}$$

On the basis of the mathematical terms in the equations (23) and (24), the combined terms can be formulated as in equations (25) and (26), and accordingly, the mathematical context for the output signal $v_{VSB}'(t)$ of the estimation filter 8 in the case of an excitation of the transmission system 1 with a VSB signal $s_{VSB}(t)$ from equation (22) can be carried over according to equation (27).

$$R(t)=\sum_{n=-\infty}^{+\infty} a_R(n)\cdot h_{GES0}(t-\varepsilon T_S-nT_S)\cdot(-1)^n \quad (25)$$

$$I(t)=\sum_{n=-\infty}^{+\infty} a_I(n)\cdot h_{GES0}\left(t-\varepsilon T_S-\frac{T_S}{2}-nT_S\right)\cdot(-1)^n \quad (26)$$

$$v'_{VSB}(t)=\left[R(t)\cdot\cos\left(2\pi\frac{f_S}{2}(t-\varepsilon T_S)\right)+ j\cdot I(t)\cdot\sin\left(2\pi\frac{f_S}{2}(t-\varepsilon T_S)\right)\right]\cdot e^{j(2\pi\Delta ft+\Delta\varphi)} \quad (27)$$

The signal $v_{VSB}'(t)$ at the output of the estimation filter 8 according to equation (27) is delayed in a subsequent time-delay unit 9 by the timing offset $-\hat{\epsilon}\cdot T_S$. The estimated timing offset $\hat{\epsilon}$, which is determined by an estimation unit, not illustrated here, for estimating the timing offset $\hat{\epsilon}$ of a VSB-modulated signal, corresponds, in the case of an optimum clock synchronisation, to the actual timing offset $\epsilon$ of the VSB modulated signal $v_{VSB}'(t)$. In this case, the output signal $v_{\epsilon VSB}'(t)$ of the time-delay unit 9 according to equation (28) is completely freed from its timing offset.

$$v'_{\varepsilon VSB}(t)=\left[R_\varepsilon(t)\cdot\cos\left(2\pi\frac{f_S}{2}\cdot t\right)+j\cdot I_\varepsilon(t)\cdot\sin\left(2\pi\frac{f_S}{2}\cdot t\right)\right]\cdot e^{j(2\pi\Delta f\cdot t+\Delta\phi)} \quad (28)$$

The associated combined terms $R_\epsilon(t)$ and $I_\epsilon(t)$ freed from the timing offset $\epsilon\cdot T$. are derived according to equations (29) and (30):

$$R_\varepsilon(t)=\sum_{n=-\infty}^{+\infty} a_R(n)\cdot h_{GES0}(t-nT_S)\cdot(-1)^n \quad (29)$$

$$I_\varepsilon(t)=\sum_{n=-\infty}^{+\infty} a_1(n)\cdot h_{GES0}\left(t-\frac{T_S}{2}-nT_S\right)\cdot(-1)^n \quad (30)$$

It is evident from equations (28), (29) and (30) that the clock-synchronised, modified VSB baseband received signal $v_{\epsilon VSB}'(t)$ does not provide the time-discrete form according to equation (31) required in order to use the maximum-likelihood method to determine the frequency-offset and phase-offset estimate $\Delta\hat{f}$ and $\Delta\hat{\phi}$:

$$r(t')=|r(t')|\cdot e^{j(2\pi\Delta ft'+\Delta\phi)} \quad (31)$$

According to the invention, the clock-synchronised, modified VSB baseband received signal $v_{\epsilon VSB}'(t)$ is therefore converted, as will be shown below, into a form corresponding to equation (31).

For this purpose, if the output signal $v_{VSB}'(t)$ of the time-delay unit 9 is observed only at the discrete timing points $$t'=\mu\cdot\frac{T_S}{2}(\mu=0,1,2,\ldots 2\cdot N-1),$$

then the output signal $v_{\epsilon VSB}'(t')$ of the time-delay unit 9 is composed according to equations (32a), (32b), (32c), and (32d) dependent upon the observed timing point, only of a purely real or purely imaginary component and a complex rotating phasor $e^{j(2\pi\Delta ft'+\Delta\phi)}$:

$$t'=0\cdot\frac{T_s}{2}: v'_{\varepsilon VSB}(t')=[R_\varepsilon(t')]\cdot e^{j(2\pi\Delta f\cdot t'+\Delta\phi)} \quad (32a)$$
$$v'_{\varepsilon VSB}(t)=R_\varepsilon(t)\cdot e^{j\left(0\frac{\pi}{2}\right)}\cdot e^{j(2\pi\Delta f\cdot t+\Delta\phi)}$$

$$t'=1\cdot\frac{T_s}{2}: v'_{\varepsilon VSB}(t')=[j\cdot I_\varepsilon(t')]\cdot e^{j(2\pi\Delta f\cdot t'+\Delta\phi)} \quad (32b)$$
$$v'_{\varepsilon VSB}(t')=I_\varepsilon(t')\cdot e^{j\left(1\frac{\pi}{2}\right)}\cdot e^{j(2\pi\Delta f\cdot t'+\Delta\phi)}$$

$$t'=2\cdot\frac{T_s}{2}: v'_{\varepsilon VSB}(t')=[-R_\varepsilon(t')]\cdot e^{j(2\pi\Delta f\cdot t'+\Delta\phi)} \quad (32c)$$
$$v'_{\varepsilon VSB}(t')=R_\varepsilon(t')\cdot e^{j\left(2\frac{\pi}{2}\right)}\cdot e^{j(2\pi\Delta f\cdot t'+\Delta\phi)}$$

$$t'=3\cdot\frac{T_s}{2}: v'_{\varepsilon VSB}(t')=[-j\cdot I_\varepsilon(t')]\cdot e^{j(2\pi\Delta f\cdot t'+\Delta\phi)} \quad (32d)$$
$$v'_{\varepsilon VSB}(t')=I_\varepsilon(t')\cdot e^{j\left(3\frac{\pi}{2}\right)}\cdot e^{j(2\pi\Delta f\cdot t'+\Delta\phi)}$$

The combined terms $R_\epsilon(t')$ and $I_\epsilon(t')$ according to equations (29) and (30) represent real-value low-pass signals, which can be either positive or negative, because of the statistical distribution of the symbol sequences $a_R(n)$ and $a_I(n)$.

In the following section, they are described respectively by the time-dependent real-value amplitude $A(t')$. Accordingly, for the output signal $v_{\epsilon VSB}'(t')$ of the time-delay unit 9 at the individual times $$t'=\mu\cdot\frac{T_S}{2}$$
$$\mu=0,1,2,\ldots 2\cdot N-1,$$

instead of timing-related individual equations (32a), (32b), (32c) and (32d), a single mathematical equation (33) containing all of the timings is obtained for the output signal $v_{\epsilon VSB}'(t')$ of the time-delay unit 9:

$$v'_{\varepsilon VSB}(t')=A(t')\cdot e^{j\left(\mu\frac{\pi}{2}\right)}\cdot e^{j(2\pi\Delta f\cdot t'+\Delta\phi)} \quad (33)$$
$$\text{for } t'=\mu\cdot\frac{T_S}{2}$$

If the time-discrete output signal $v_{\epsilon VSB}'(t')$ of the time-delay unit 9 is frequency-displaced at the individual sampling times $$t'=\mu\cdot\frac{T_S}{2}\quad \mu=0,1,2,\ldots 2\cdot N-1$$

by a factor $$-\frac{\pi}{2},$$

a frequency-displaced, time-discrete signal $w_{VSB}'(t')$ according to equation (34) is obtained from the time-discrete output signal $v_{\epsilon VSB}'(t')$ of the time-delay unit 9, which, by comparison with the time-discrete output signal $v_{\epsilon VSB}'(t')$ of the time-delay unit 9, is freed from the complex term $$e^{j\mu\frac{\pi}{2}}:$$

$$w_{VSB}'(t')=A(t')\cdot e^{j(2\pi\Delta f\cdot t'+\Delta\phi)} \quad (34)$$

Since the amplitude A(t') of the signal $w_{VSB}'(t')$ can adopt positive and negative values, a modulus for the amplitude must be formed. A modulus for the amplitude A(t') of a complex signal is formed by squaring and subsequent division by the modulus of the complex signal. The phase of the complex signal is doubled by this process, but the modulus remains unchanged.

The use of a squaring of the signal $w_{VSB}'(t')$ and subsequent division by the modulus of the signal $w_{VSB}'(t')$ leads to the signal $x_{VSB}'(t')$ according to equation (35), which can be interpreted as a time-discrete, complex rotating phasor with a time-discrete amplitude $|A(t')|$ and a time discrete phase $2\cdot(2\pi\Delta ft'+\Delta\phi)=2\cdot(\Delta\omega\mu T_S+\Delta\phi)$ in the sense of FIG. 4 and which has the form according to equation (31) appropriate for a maximum-likelihood estimation of the frequency offset and phase offset of the carrier signal:

$$x_{VSB}'(t')=|A(t')|\cdot e^{j2(2\pi\Delta f\cdot t'+\Delta\phi)}+n(t') \quad (35)$$

Moreover, in equation (34), the additive interference n(t') is also taken into consideration, which, in a good approximation, is un-correlated and provides a Gaussian distribution. Accordingly, the optimum estimated value for $\Delta\hat{f}$ and $\Delta\hat{\phi}$ is obtained by maximising the maximum-likelihood function $L(\Delta\hat{f}, \Delta\hat{\phi})$, which according to equation (36), corresponds to a maximising of the real components of all time-discrete, complex rotating phasors of the signal $x_{VSB}'(t')$:

$$L(\Delta\hat{f}, \Delta\hat{\varphi}) = \mathrm{Re}\left\{\sum_{\mu}\left|x'_{VSB}\left(t'=\mu\cdot\frac{T_s}{2}\right)\right|\cdot e^{-j2\left(2\pi\Delta\hat{f}\mu\frac{T_s}{2}+\Delta\hat{\varphi}\right.}\right. \quad (36)$$

Maximising the real components of all time-discrete, complex rotating phasors of the signal $x_{VSB}'(t')$ can be interpreted as a “turning back” of the time-discrete, complex rotating phasors of the signal $x_{VSB}'(t')$ respectively by the phase angle $$2\cdot\left(2\pi\Delta f\mu\frac{T_s}{2}+\Delta\varphi\right)$$

until these coincide with the real axis in the complex plane.

With reference to the derivation of the mathematical background, a description of the device according to the invention for carrier-frequency synchronisation with a VSB-modulated signal according to FIG. 3 and of the method according to the invention for carrier-frequency synchronisation with a VSB-modulated signal according to FIG. 5 is provided below.

In the case of an inverted position of the sideband, the VSB baseband received signal $r_{VSB}(t)$ according to equation (16) is subjected, in a unit for sideband mirroring 10 in the device according to the invention as shown in FIG. 3, to a mirroring of the sideband at the carrier frequency $f_T$ into the normal position.

Following this, the VSB baseband received signal $r_{VSB}(t)$ is mixed down in a down mixer 11 by means of a mixer signal $$e^{-j\frac{2\pi}{4T_{VSB}}t}$$

by the frequency $$\frac{f_{SVSB}}{4}$$

into a modified VSB baseband received signal $r_{VSB}'(t)$ according to equation (18).

A downstream sampling and holding element 7 with an oversampling factor os samples the modified VSB the baseband received signal $r_{VSB}'(t)$. An estimation filtering in the sense of equation (22) or respectively (27) also takes place in a signal-adapted estimation filter 8. A clock synchronisation of the output signal $v_{VSB}'(t)$ of the estimation filter 8 by the timing offset $-\hat{\epsilon}\cdot T_S$ is carried out in a downstream time-delay unit 9 according to equation (28). The estimated timing offset $\hat{\epsilon}$, which is determined by an estimation unit, not illustrated here, for the estimation of the timing offset $\hat{\epsilon}$ of a VSB-modulated received signal, corresponds, in the case of an optimum clock synchronisation, to the actual timing offset $\epsilon$ of the VSB-modulated baseband received signal $r_{VSB}'(t)$.

The clock-synchronised output signal $v_{\epsilon VSB}'(t)$ of the time-delay unit 9 is sampled down in a sampling and holding element 12 referred to below as the first sampling and holding element to two sampling values per symbol period $T_S$.

The output signal $v_{\epsilon VSB}'(t')$ of the first sampling and holding element 12 is supplied to a complex multiplier 13, in which it is subjected to a sampling-time-related phase offset by the phase angle $$-\mu\cdot\frac{T_S}{2}.$$

The output signal $w_{VSB}'(t')$ of the complex multiplier 13, accordingly phase-displaced in its phase relative to the signal $v_{\epsilon VSB}'(t')$, is supplied to a unit for modulus-scaled squaring 14, consisting of a squaring unit, a modulus former and a divider connected downstream of the squaring unit and the modulus former, in which a modulus for its amplitude is formed and its phase is doubled.

The signal at the output of the unit for modulus-scaled squaring 14 represents the modified VSB baseband received signal $x_{VSB}'(t')$, which the signal-processing unit 15 has generated from the clock-synchronised VSB baseband received signal $v_{\epsilon VSB}'(t)$ by undersampling in the first sampling and holding element 12, by phase displacement in the complex multiplier 13 and by modulus formation of the amplitude or respectively doubling of the phase in the unit for modulus-scaled squaring 14.

The estimated values $\Delta\hat{f}$ and $\Delta\hat{\phi}$ for the frequency offset and phase offset of the carrier signal are determined, as described, for example, in DE 103 09 262 A1, from the time-discrete, modified VSB a baseband received signal $x_{VSB}'(t')$ in a subsequent maximum-likelihood estimator 18.

A frequency offset and phase offset estimator, such as that disclosed in DE 103 09 262, which avoids any $2\pi$ slips occurring in the phase characteristic—so-called “cycle slips”, which, in the case of a phase regression, result, through small amplitudes of the time-discrete, modified received signal x(t'), from the superimposed interference, can be used as a maximum-likelihood estimator. Accordingly, the phase regression cannot be used for this application.

The method according to the invention for carrier-frequency synchronisation of a VSB-modulated signal is described below with reference to FIG. 5.

In procedural stage S10, the sideband of the VSB baseband received signal $r_{VSB}(t)$ is mirrored by the carrier frequency $f_T$ from an inverted position into a normal position, if the sideband is disposed in the inverted position.

In the next procedural stage S20, the VSB baseband received signal $r_{VSB}(t)$ is mixed down with a mixer signal $$e^{-j\frac{2\pi}{4T_{VSB}}t}$$

by the frequency $$\frac{f_{SVSB}}{4}$$

into a modified baseband received signal $r_{VSB}'(t')$ according to equation (18).

In the next procedural stage S30, the modified VSB baseband received signal $r_{VSB}'(t)$ is sampled in a second sampling with an oversampling factor of typically eight.

The sampled, modified VSB baseband received signal $e_{VSB}'(t')$ is supplied, in procedural stage S40, to an estimation filter according to equations (22) and (27) respectively, which minimises data-dependent jitter in the sampled, modified baseband received signal $e_{VSB}'(t)$.

In the next procedural stage S50, a clock-synchronisation of the sampled and filtered, modified VSB baseband received signal $v_{\epsilon VSB}'(t)$ takes place according to equation (28) by means of a time-delay unit 9, which receives the estimated timing offset $\hat{\epsilon}$ from an estimator, which is not described in greater detail here.

In the next procedural stage S60, an additional sampling takes place—a first sampling—of the clock-synchronised VSB baseband received signal $v_{\epsilon VSB}'(t)$ at two sampling values per symbol period $T_S$ according to equation (33).

In the next procedural stage S70, the additionally sampled clock-synchronised VSB baseband received signal $v_{\epsilon VSB}'(t')$ is frequency displaced by complex multiplication with a sampling-time-related multiplication factor $$e^{-j\mu\frac{\pi}{2}}$$

to compensate the respective inverse complex factor $$e^{j\mu\frac{\pi}{2}}$$

in the additionally sampled signal $v_{\epsilon VSB}'(t')$ according to equation 34.

The next procedural stage S80 contains the modulus formation of the time-discrete amplitudes A(t') and a doubling of the time-discrete phases $2\pi\Delta ft'+\Delta\phi$ of the frequency-displaced, additionally-sampled and clock-synchronised VSB baseband received signal $w_{VSB}'(t')$ according to equation (35).

In the next procedural stage S90, the time-discrete, modified VSB baseband received signal $x_{VSB}'(t')$ obtained from the clock-synchronised VSB baseband received signal $v_{\epsilon VSB}'(t)$ in procedural stages S60, S70 and S80 by means of the signal-processing unit 15 is used to determine the frequency offset and phase offset value $\Delta\hat{f}$ and $\Delta\hat{\phi}$ of the carrier signal by means of maximum-likelihood estimation according to equation (36). The maximum-likelihood estimator used should ideally be able to overcome any phase slips—so-called "cycle slips" resulting from interference signals, which are superimposed on the modified VSB baseband received signal $v_{\epsilon VSB}'(t)$ in the case of small amplitudes of the modified VSB baseband received signal $v_{\epsilon VSB}'(t)$, and is disclosed, for example, in DE 103 09 262 A1.

The invention claimed is:

1. A computer-implemented method for carrier-frequency synchronization of a carrier signal ($e^{j(2\pi(f_T+\Delta f)t+\Delta\phi)}$) affected by a frequency offset or a phase offset ($\Delta f$, $\Delta\phi$) comprising:

receiving a vestigial-sideband-modulated signal ($r_{VSB}(t)$);

converting the received signal into a modified vestigial-sideband-modulated received signal ($x_{VSB}'(t')$) with time-discrete, complex rotating phasors ($|A(t')|\cdot e^{j2(2\pi\Delta f\cdot t'+\Delta\phi)}$), in which only the time-discrete phases ($2\cdot(2\pi\Delta ft'+\Delta\phi)$) are dependent upon the frequency offset or phase offset ($\Delta f$, $\Delta\phi$); and performing a maximum-likelihood estimation of the frequency and phase offsets using the time-discrete, complex rotating phasors, wherein the time-discrete phases ($2\cdot(2\pi\Delta ft'+\Delta\phi)$) of the complex rotating phasors ($|A(t')|\cdot e^{j2(2\pi\Delta f\cdot t'+\Delta\phi)}$), of the modified vestigial-sideband-modulated received signal ($x_{VSB}'(t')$), are dependent only upon the frequency offset or phase offset ($\Delta f$, $\Delta\phi$), and the symbol duration ($T_{VSB}$) of the vestigial-sideband-modulated received signal ($r_{VSB}(t)$) is half of the symbol duration ($T_S$) of the received signal (r(t')).

2. A computer-implemented method for carrier-frequency synchronization of a carrier signal ($e^{j(2\pi(f_T+\Delta f)t+\Delta\phi)}$) affected by a frequency offset or a phase offset ($\Delta f$, $\Delta\phi$) comprising:

receiving a vestigial-sideband-modulated signal ($r_{VSB}(t)$);

converting the received signal into a modified vestigial-sideband-modulated received signal ($x_{VSB}'(t')$) with time-discrete, complex rotating phasors ($|A(t')|\cdot e^{j2(2\pi\Delta f\cdot t'+\Delta\phi)}$), in which only the time-discrete phases ($2\cdot(2\pi\Delta ft'+\Delta\phi)$) are dependent upon the frequency offset or phase offset ($\Delta f$, $\Delta\phi$); and performing a maximum-likelihood estimation of the frequency and phase offsets using the time-discrete, complex rotating phasors, wherein the conversion of the vestigial-sideband-modulated received signal ($r_{VSB}(t)$) consists of a down mixing by a quarter of the symbol frequency $$\left(\frac{f_{SVSB}}{4}\right),$$

a first sampling at two sampling values per symbol period ($T_S$), a complex multiplication and a modulus-scaled squaring.

3. A computer-implemented method for clock synchronization of a carrier signal ($e^{j(2\pi(f_T+\Delta f)t+\Delta\phi)}$) affected by a frequency offset or a phase offset ($\Delta f$, $\Delta\phi$) comprising:

receiving a vestigial-sideband-modulated signal ($r_{VSB}(t)$);

converting the received signal into a modified vestigial-sideband-modulated received signal ($X_{VSB}'(t')$) with time-discrete, complex rotating phasors ($|A(t')| \cdot e^{j2(2\pi\Delta f \cdot t'+\Delta\phi)}$), in which only the time-discrete phases ($2\cdot(2\pi\Delta ft'+\Delta\phi)$) are dependent upon the frequency offset or phase offset ($\Delta f$, $\Delta\phi$); and performing a maximum-likelihood estimation of the frequency and phase offsets using the time-discrete, complex rotating phasors, wherein the symbol duration ($T_{VSB}$) of the vestigial-sideband-modulated received signal ($r_{VSB}(t)$) is half of the symbol duration ($T_S$) of the received signal ($r(t')$).

4. A computer-implemented method for clock synchronization according to claim 2, wherein the complex multiplication takes place with the complex phase angle $$e^{-j\mu\frac{\pi}{2}},$$

wherein $\mu$ is the sampling index.

5. A computer-implemented method for clock synchronization according to claim 2, wherein the modulus-scaled squaring takes place by parallel squaring, modulus formation and subsequent division.

6. A computer-implemented method for clock synchronization according to claim 2, wherein in the case of an inverted position of the sideband of the vestigial-sideband-modulated received signal ($r_{VSB}(t)$), the down mixing is preceded by a mirroring of the sideband from the inverted position into the normal position.

7. A computer-implemented method for clock synchronization according to claim 2, wherein the down mixing of the vestigial-sideband-modulated received signal ($r_{VSB}(t)$) is followed by an over-sampling, an estimation filtering and a clock synchronization.

8. A computer-implemented method for clock synchronization according to claim 2, wherein the conversion of the vestigial-sideband-modulated received signal ($r_{VSB}(t)$) is followed by a maximum-likelihood estimation of the frequency offset and phase offset ($\Delta f$, $\Delta\phi$) of the carrier signal ($e^{j(2\pi(f_T+\Delta f)t+\Delta\phi)}$).

9. A device for carrier-frequency synchronization of a carrier signal ($e^{j(2\pi(f_T+\Delta f)t+\Delta\phi)}$) affected by a frequency offset or phase offset ($\Delta f$, $\Delta\phi$) with a maximum-likelihood estimator for estimating the frequency offset or phase offset ($\Delta f$, $\Delta\phi$) of the carrier signal ($e^{j(2\pi(f_T+\Delta f)t+\Delta\phi)}$) from a received signal ($r(t')$) with time-discrete, complex rotating phasors ($|r(t')| \cdot e^{j2\pi\Delta f \cdot t'+\Delta\phi}$), in which only the time-discrete phases ($2\pi\Delta ft'+\Delta\phi$) are dependent upon the frequency offset or phase offset ($\Delta f$, $\Delta\phi$), wherein the maximum-likelihood estimator is preceded by a signal-processing unit and a down mixer, which converts the received signal ($r(t')$) which is a vestigial-sideband-modulated received signal ($r_{VSB}(t)$), into a modified vestigial-sideband-modulated received signal ($X_{VSB}'(t')$) with time-discrete complex rotating phasors ($|A(t')| \cdot e^{j2(2\pi\Delta f \cdot t'+\Delta\phi)}$), in which only the time-discrete phases ($2\pi\Delta ft'+\Delta\phi$) are dependent upon the frequency offset or phase offset ($\Delta f$, $\Delta\phi$), and wherein the signal-processing unit includes of a first sampling unit, a complex multiplier and a unit for modulus-scaled squaring, wherein the unit for modulus-scaled squaring includes a squaring element and a parallel-connected modulus former with a divider connected downstream of the squaring element and the modulus former.

10. A device for carrier-frequency synchronization of a carrier signal ($e^{j(2\pi(f_T+\Delta f)t+\Delta\phi)}$) affected by a frequency offset or phase offset ($\Delta f$, $\Delta\phi$) with a maximum-likelihood estimator for estimating the frequency offset or phase offset ($\Delta f$, $\Delta\phi$) of the carrier signal ($e^{j(2\pi(f_T+\Delta f)t+\Delta\phi)}$) from a received signal ($r(t')$) with time-discrete, complex rotating phasors ($|r(t')| \cdot e^{j2\pi\Delta f \cdot t'+\Delta\phi}$), in which only the time-discrete phases ($2\pi\Delta ft'+\Delta\phi$) are dependent upon the frequency offset or phase offset ($\Delta f$, $\Delta\phi$), wherein the maximum-likelihood estimator is preceded by a signal-processing unit and a down mixer, which converts the received signal ($r(t')$) which is a vestigial-sideband-modulated received signal ($r_{VSB}(t)$), into a modified vestigial-sideband-modulated received signal ($X_{VSB}'(t')$) with time-discrete complex rotating phasors ($|A(t')| \cdot e^{j2(2\pi\Delta f \cdot t'+\Delta\phi)}$), in which only the time-discrete phases ($2\pi\Delta ft'+\Delta\phi$) are dependent upon the frequency offset or phase offset ($\Delta f$, $\Delta\phi$), and wherein the down mixer is preceded by a unit for sideband mirroring and is followed by a second sampling unit, an estimation filter and a time-delay unit for clock synchronization.

11. A device for carrier-frequency synchronization of a carrier signal ($e^{j(2\pi(f_T+\Delta f)t+\Delta\phi)}$) affected by a frequency offset or phase offset ($\Delta f$, $\Delta\phi$) with a maximum-likelihood estimator for estimating the frequency offset or phase offset ($\Delta f$, $\Delta\phi$) of the carrier signal ($e^{j(2\pi(f_T+\Delta f)t+\Delta\phi)}$) from a received signal ($r(t')$) with time-discrete, complex rotating phasors ($|r(t')| \cdot e^{j2\pi\Delta f \cdot t'+\Delta\phi}$), in which only the time-discrete phases ($2\pi\Delta ft'+\Delta\phi$) are dependent upon the frequency offset or phase offset ($\Delta f$, $\Delta\phi$), wherein the maximum-likelihood estimator is preceded by a signal-processing unit and a down mixer, which converts the received signal ($r(t')$) which is a vestigial-sideband-modulated received signal ($r_{VSB}(t)$), into a modified vestigial-sideband-modulated received signal ($X_{VSB}'(t')$) with time-discrete complex rotating phasors ($|A(t')| \cdot e^{j2(2\pi\Delta f \cdot t'+\Delta\phi)}$), in which only the time-discrete phases ($2\pi\Delta ft'+\Delta\phi$) are dependent upon the frequency offset or phase offset ($\Delta f$, $\Delta\phi$), and wherein the down mixer is followed by a second sampling unit, an estimation filter and a time-delay unit for clock synchronization.

12. A computer-readable storage medium with electronically-readable control signals, which can cooperate with a programmable computer or digital signal processor, the storage medium being encoded with instructions for executing the method according to claim 1.

13. A computer software product with program-code means stored on a machine-readable storage medium, in order to implement all of the stages according to claim 1, when the program is executed on a computer or a digital signal processor.

14. A computer-readable medium embodying program code means, the program code means comprising instructions for implementing all of the stages according to claim 1, when the program is executed on a computer or a digital signal processor.

15. A computer-readable medium embodying program code means, in order to implement all of the stages according to claim 1, when the program is stored on a machine-readable data storage medium.

* * * * *